United States Patent

Knoche et al.

[11] 3,935,727
[45] Feb. 3, 1976

[54] PRESSURE JUMP RELAXATION MEASUREMENT APPARATUS

[75] Inventors: Wilhelm Knoche, Gottingen; Gottfried Wiese, Sieboldshausen, both of Germany

[73] Assignee: Max-Planck-Gesellschaft zur Forderung der Wissenschaften e.V., Gottingen, Germany

[22] Filed: June 21, 1974

[21] Appl. No.: 481,817

[30] Foreign Application Priority Data
July 17, 1973 Germany............................ 2336377

[52] U.S. Cl......................................... 73/37; 73/53
[51] Int. Cl.²...................... G01N 33/00; B01J 3/04
[58] Field of Search .................. 73/37, 53; 23/290; 324/30 B

[56] References Cited
UNITED STATES PATENTS
3,720,094   3/1973   Knoche................................. 73/37

*Primary Examiner*—Charles A. Ruehl
*Attorney, Agent, or Firm*—Flynn and Frishauf

[57] ABSTRACT

An autoclave body is formed with a pressure chamber which has a closable opening; to permit rapid replacement of a rupturing membrane, the body is formed with a slot, channel, or notch, in which a strip of membrane material can be inserted, to be secured against the opening of the chamber by a quick-release movable pressure head, so that, upon rupturing of the membrane facing the pressure head, a new element of membrane material can be quickly placed over the opening of the chamber. The movable pressure head is hollow, with a cylinder opening facing the pressure head opposite the membrane side which closes the opening, and a piston is located in the hollow of the pressure head, to permit application of a vacuum to the side of the membrane not facing the opening of the pressure fluid chamber. The measuring cells are located diametrically opposite from each other, at an inclination with respect to the axis of the cell, so that the axes of the measuring elements face upwardly, to avoid entrapment of air bubbles at the faces thereof. At least a portion of the entire cell is formed with an internal chamber through which a thermostatically controlled temperature control fluid is circulated to maintain the cell at an event temperature.

13 Claims, 5 Drawing Figures

PRESSURE JUMP RELAXATION MEASUREMENT APPARATUS

Cross reference to related patent: U.S. Pat. No. 3,720,094, assigned to the assignee of the present invention.

The present invention relates to an apparatus for measure relaxation pressure jumps, and more particularly to an autoclave apparatus in which sequential measurements can be carried out accurately and rapidly.

Autoclaves to make pressure jump relaxation measurements have previously been proposed - see U.S. Pat. No. 3,720,094, by the inventor hereof and assigned to the assignee of the present application, and references referred to in this prior patent. The accuracy of such measurements can be substantially increased, if sequential measuring tests can be carried out with one sample, and the results are then averaged. This, however, presupposes that the various separate measurements can be carried out rapidly and can be evaluated quickly. Rapid evaluation of measuring or test results is possible by means of modern electronic data processing devices, operating in real time. Such an electronic evaluation apparatus is described in copending application Ser. 451,229, assigned to the assignee of the present application. Autoclaves, and the associated devices which actually measure the pressure jumps were, however, exceedingly slow with respect to the data processing capabilities of electronic computers.

It is an object of the present invention to provide a device for pressure jump relaxation measurement which permits repetitive, rapidly sequenced tests or measurements with respect to the same sample, which permits rapid exchange of samples, and which, further, provides accurate results.

Subject matter of the present invention:

Briefly, an autoclave body is provided which is formed with a channel in which a membrane to be ruptured can be inserted in form of a strip or tape, so that, repetitively, the rupturing membrane can be easily replaced upon each pressure jump relaxation test, by merely pulling the strip or tape through the channel and across the test or measuring chamber.

In accordance with a feature of the invention, the tape or strip of membrane material is clamped in a pressure head. The tape or strip is clamped to a sealing ring closing off the measuring chamber by means of a rapidly releasable, preferably rotatable hand-wheel, so that a new membrane element can pulled across the measuring chamber, after rupturing of the membrane during a preceding test, by turning the hand-wheel, thus releasing the tape, pulling the tape, and re-tightening the hand-wheel to seal the tape across the test chamber. Thus, sequential measurements can be rapidly effected, each time with a new membrane element which is closely analogous to that of a preceding membrane element, all being formed on the same membrane tape, or strip.

The invention will be described by way of example with reference to the accompanying drawings, wherein.

Figure 1:
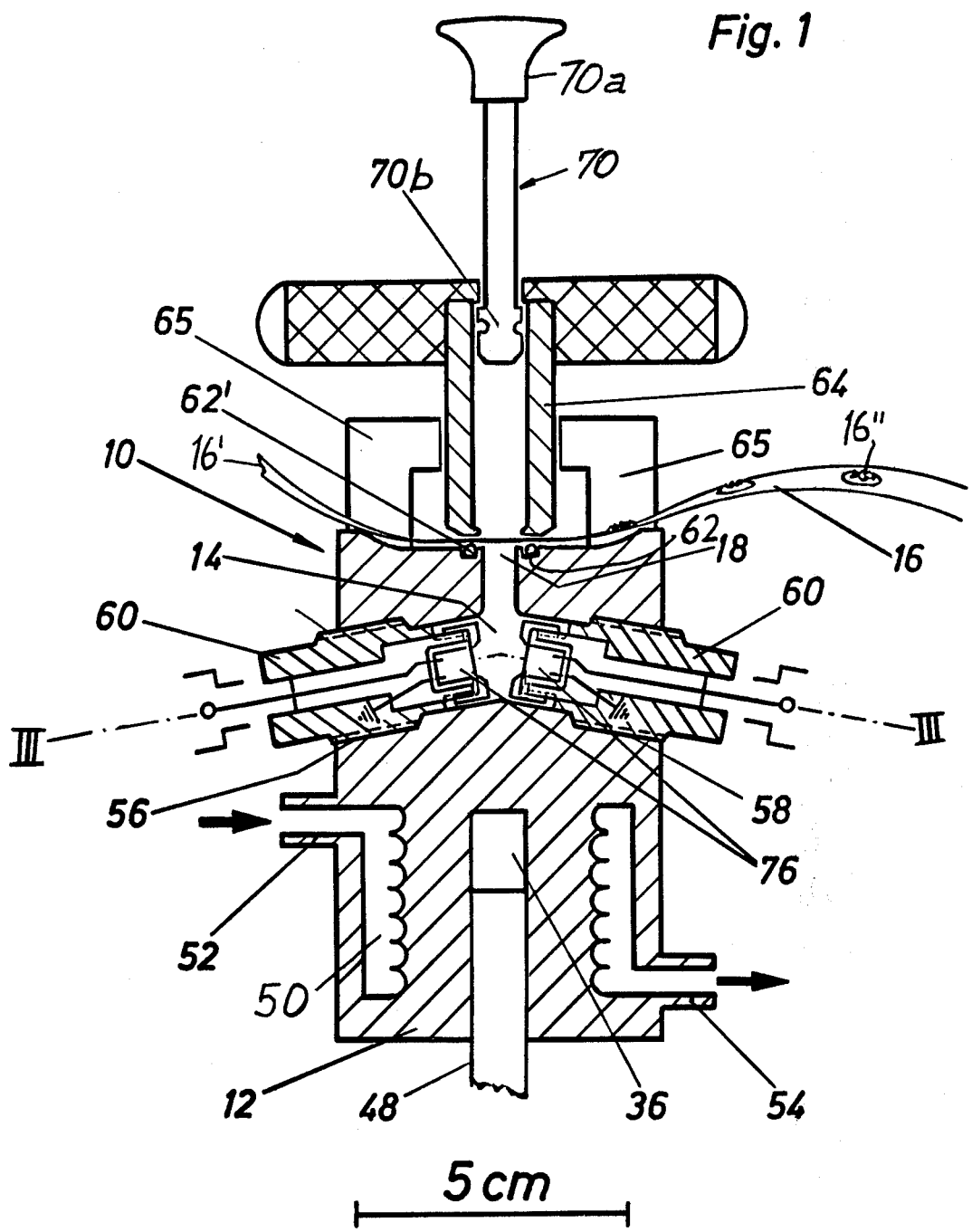
FIG. 1 is a simplified, schematic axial cross-sectional view through an autoclave chamber structure, in accordance with the present invention.

The autoclave unit 10 (FIGS. 1-3) essentially includes a pressure-resistant, mechanically strong autoclave body 12 which is shaped to provide a pressure chamber 14, closed off by a membrane 16 which may rupture. The membrane 16 closes off opening 18, of the pressure or rupturing chamber. The rupturing membrane 16 is formed as a strip, or tape, which is moved across opening 18, in sectional strips, from left to right (FIG. 1) where, at the left side, membrane strip 16' is shown as a whole, solid tape or strip, whereas at the right side, after use, the ruptured zones 16'' are visible. The membrane strip 16 is brought across opening 18 manually, for example by pulling the strip across opening 18, after release from tight engagement.

The body 12 of the autoclave has two diametrically oppositely located, radially extending threaded bores 20, 22 (FIG. 2) in which transducers 24, 28 are located. Transducer 24 is a pressure transducer having a piezo sensing element 26, for example a barium titanate element at its sensing head. The temperature transducer 28 may, for example, include a thermistor 30, that is, a negative temperature coefficient (NTC) resistor. Transducers 24, 28 are tightly screwed into the body structure 12 of the autoclave. The temperature sensor 28 is formed with a pressure channel 34, sealed by a sealing ring 32 (FIG. 2) to body 12. The channel or duct 34 is connected to a duct 36', formed in the body 12, which is in connection with a cylinder 36 formed in the body; and, further, connects to a duct 40 leading to the pressure chamber 14. A felt plug 38 is located in the duct 36' intermediate the duct or channel 34 and the cylinder 36. Felt plug 38 has the function of a check valve, which is customary in this position in piston pumps; additionally, the felt plug permits equalization of the pressure which arises upon closing of the measuring chamber 14 by withdrawal of the piston of the pump. It is necessary to equalize, that is, to null the pressure to permit accurate balancing of an electrical measuring bridge in advance of making test measurements. A bore 42 branches off from duct 36' in the region between the felt plug 38 and the cylinder 36. Bore 42 is enlarged to retain a check valve element 44. Bore 43 leads to a pressure medium refill connection 46, which is connected to a suitable pressure medium source. Water is a suitable pressure medium.

A piston 48 tightly fits into cylinder 36. It can be moved by a manually operable lever, hydraulically or pneumatically. The portion of the body 12 of the autoclave 10 additionally is so shaped to form a ring-shaped chamber 50 (FIGS. 1, 2) which is additionally formed with fluid inlet and outlet stubs 52, 54, adapted for connection to a suitable temperature maintaining fluid, so that the temperature of the autoclave body may be maintained at a fixed, suitably selected level, by circulating a fluid medium kept at a controlled temperature through chamber 50. Thus, the entire autoclave body can be maintained at an essentially constant temperature during a sequence of test measurements.

Figure 2:
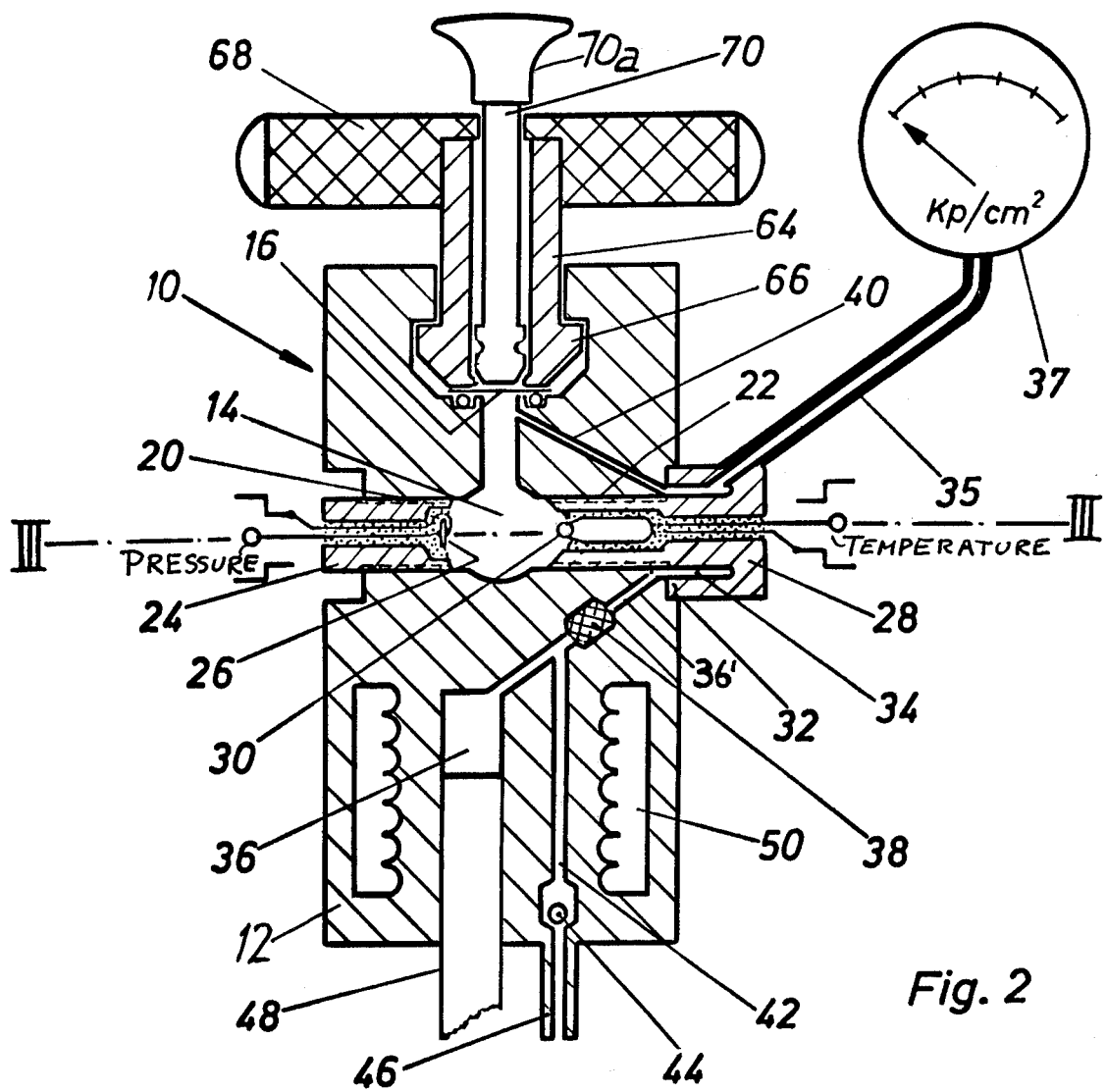
FIG. 2 is a view similar to FIG. 1, but rotated 90° with respect thereto.
Figure 3:
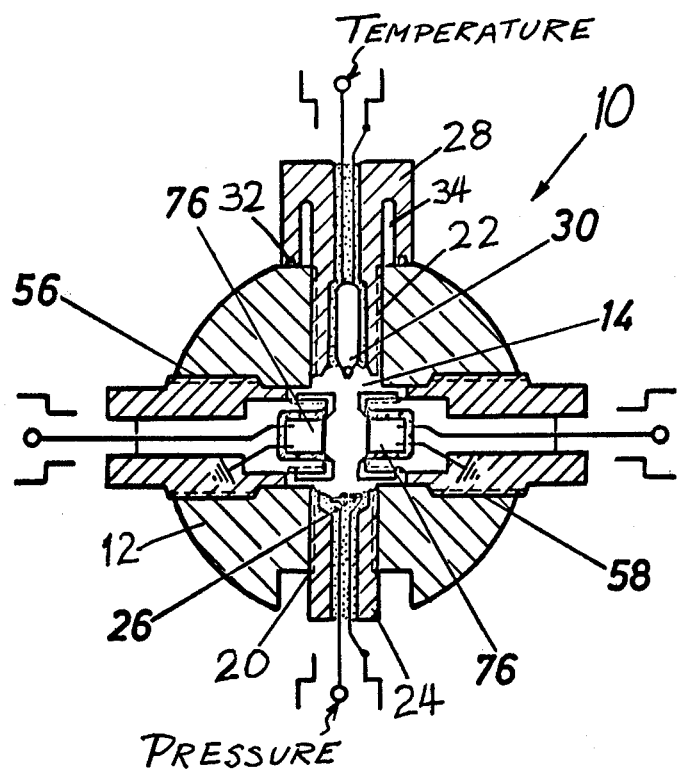
FIG. 3 is a transverse cross-sectional view taken along an undulating section, as defined by the section lines III—III in FIGS. 1 and 2.

Referring now to FIGS. 1 and 3, two diametrically located bores 56, 58 are formed in the body 12, offset 90° with respect to bores 20, 22 (FIGS. 1, 3). Transducers 60, forming measuring cells, are tightly screwed into bores 56, 58. The bores 56, 58 are inclined with respect to a transverse plane across the autoclave body; the angle of inclination may be small, that is, about 10°, although the angle may be substantially more, for example 45°; the bores may, also, extend perpendicularly, for example as shown in the aforementioned cross-referenced Pat. No. 3,720,094, or offset 90° with respect to the axis of the chamber. Preferably, the direction of inclination is so selected that the axes through bores 56, 58 form an apex directed towards the opening 18 of chamber 14. This arrangement prevents the formation of air bubbles at the inwardly facing ends of the measuring cells 60.

The opening 18 at the terminal end of chamber 14 ends in a ridge; a ring groove 62 is formed around the ridge, in which a sealing ring 62' is located. Sealing ring 62' is provided to form a tight seal with respect to the strip, or tape membrane 16. To permit insertion and pulling through of the membrane, the autoclave body is formed with a notch at its upper end, the facing wall 65 of which is visible in FIG. 1. The membrane strip 16 can be inserted from above into the notch, and pulled across opening 18. A pressure head in forms of a clamping element 64 can be clamped downwardly (FIGS. 1, 2) against the membrane strip 16, to seal the membrane strip 16 against the sealing ring 62' (which may be an O ring). The pressure head, or clamping element 64 forms a sealing body which is tubular. It is formed at its lower end with a pair of projecting ridges 66 (FIG. 2) which permit insertion thereof into the body 12 of the autoclave and, by giving a twist, locking the pressure head 64 in the form of a bayonet connection in the autoclave body, simultaneously pressing the pressure head 64 against the membrane strip 16 and hence sealing the membrane strip 16 across the opening 18 of chamber 14. The engagement of the projections 66 with a matching projection formed on the body 12 (see FIG. 2) may be slightly spiralled, or thread-shaped with an inclination, to provide for tight engagement pressure, and still permitting quick release. The ring-shaped pressure duct 34 in the transducer element 28 (FIG. 2) is further connected to a pressure gauge 37 by means of a connecting duct 35.

The pressure head 64 can be lifted, inserted, and rotated by handling a manually operable hand-wheel 68, secured thereto at its outer end by a suitable connection, for example by an interference fit and spot-welding.

The pressure head 64 is, further, shaped to form a vacuum pump, in order to permit application of vacuum to the side of the membrane opposite that of the pressure chamber 14. The vacuum pump is formed by a piston unit 70, manually operated by a plunger head 70a and formed, at the other end, with a sealing head 70b, sealed against the inner wall of the pressure head 64. This simple piston pump, in which the piston can preferably locked in pulled-out position by a simple twist, permits generation of a pressure in the pressure head 64 of about 5 Torr. This effectively suppresses acoustic noise interference and disturbance during testing for pressure jumps. The volume of the pressure chamber is very small, which further improves the noise and disturbance level in the measurements. The pressure chamber 14, terminating adjacent the opening 18, prevents the formation of tiny air bubbles so that if water is used as a pressure means, the water will not flow past the measuring cells. It is practically impossible to completely exclude air, and bubbles from water, even if extensive precautions are taken that such air bubbles do not reach the measuring region, zone, or chamber. Water has an advantage with respect to other fluids, such as Xylol when used as a pressure medium, since it is much less compressible than Xylol, or other materials.

Figure 4:
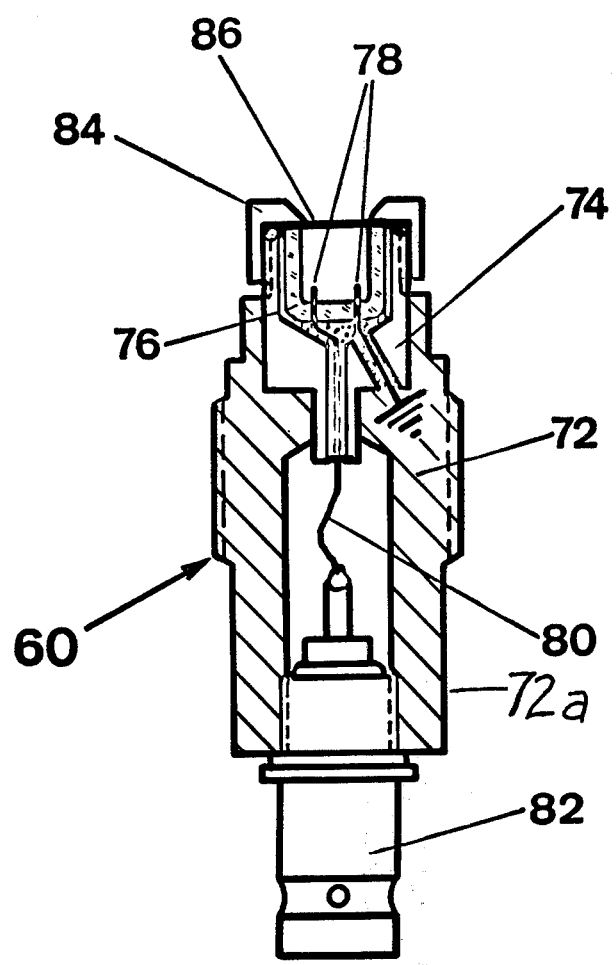
FIG. 4 is a schematic longitudinal sectional view, to an enlarged scale, of a measuring cell.

The construction of the measuring cells themselves is illustrated in detail in FIG. 4. Each cell unit, basically, has a metal body, typically brass, which is threaded at its outer circumference. The brass body is sleeve-like and formed with a central bore. The inner end of the bore is relieved, in which a cup-shaped insert 74 is included, formed of plastic, to provide electrical isolation, a sealing element, and a shock absorbing and protective bushing. A cup-shaped glass element 76 is inserted in the cup-shaped plastic insert 74. Two platinum electrodes 78 extend into the glass cup 76, being melted through the body of the glass cup. One electrode is connected by means of an inclined slanting stub to the brass body 72; the other electrode is connected by means of a central conductor 80 to the inner terminal of a conventional coaxial terminal 82, the outer terminal of which connects with the brass body 72. The cup-shaped plastic insert 74 is formed with an outer thread, on which a coupling nut 84 is screwed which, together with a plastic disk 86, closing off the measuring chamber formed by the glass cup 76. The free or outer end 72a of the brass body 72 preferably is formed with a hexagonal circumference so that it can be readily handled and screwed into the body 12, and tightened by means of a fitting wrench, and then permitting ready removal, or replacement. The autoclave body 12 preferably is of circular, or square cross section, preferably made of bronze, and is covered with a coating of a plastic such as PVC, about 5 mm thick, and forming a thermal insulation. The temperature gradients thus arising in the autoclave body 12 may be neglected. The pressure pump is also thermostatically controlled, and thus the temperature does not change in the pressure chamber, and adjacent the pressure chamber when water is pumped into the pressure chamber.

Figure 5:
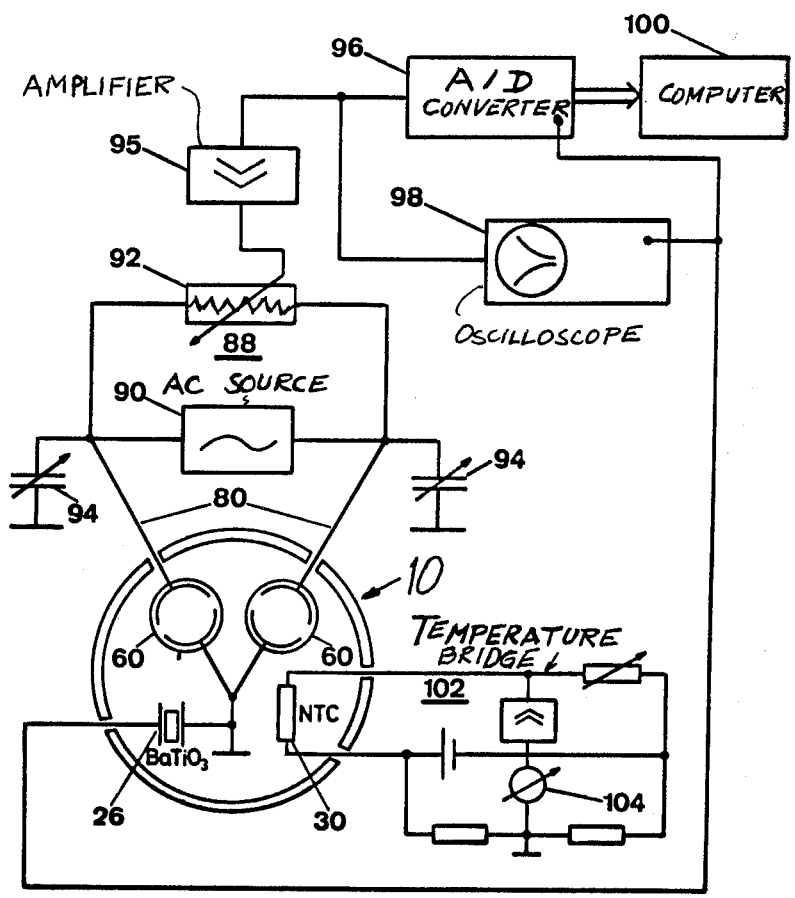
FIG. 5 is a highly schematic fragmentary circuit and test arrangement diagram for pressure jump relaxation measurements, in which the apparatus of FIGS. 1-4 is included.

FIG. 5 illustrates the autoclave chamber in a complete pressure jump relaxation measuring system. The autoclave unit 10 is illustrated only schematically. Connections 80 from the measuring cells (FIGS. 1, 3, 4) are connected to a bridge 88 of essentially conventional construction, supplied from an a-c source 90. The bridge includes a pair of balancing capacitors 94, and a balancing resistor 92. The output terminal of the bridge 88 is connected over an amplifier 95 to the input of an analog-digital (A/D) converter 96, and also to an oscilloscope 98. The output signal of the A/D converter 96 is applied by means of a suitable cable to a data processing device 100. The pressure sensing transducer 26, shown as a barium titanate unit, provides a pulse signal, when a pressure jump is sensed, which connects to the trigger input of the oscilloscope 98 and also triggers the A/D converter 96 to commence operation. The NTC resistor 30 is connected to a conventional temperature bridge 102, in which an indicator 104 is provided to measure the temperature in the pressure chamber.

Various changes and modifications may be made within the scope of the inventive concept, and various features described in connection with the present invention may be used independently in a relaxation measuring system. Thus, the strip or tape-shaped rupturing membrane, the arrangement of the pressure pump in the autoclave body in combination with its temperature stabilization, and the shape and construction of the pressure head to form, simultaneously, a pump to provide a vacuum, may be used independently or separately from each other in such instruments. The combination of all these features permits rapid sequential pressure jump relaxation measurements which are essentially free of interference, disturbance or noise signals. The membrane, which may be of polyethylene, need not be in strip form, but may be any type of sheet material, e.g. a disk, or a ring, inserted over opening 18 in a suitably shaped slot or body 12.

We claim:

1. Pressure jump relaxation measurement apparatus comprising an autoclave body forming a pressure chamber having a closable opening;
a rupturable membrane closing said opening;
two electrical measuring cells facing said pressure chamber, and means connecting said cells to an electrical output;
the improvement wherein
the body is formed with a notch, or channel, leading from an outside surface of said body to the opening of the chamber and continuing to an opposite outside surface of said body;
the membrane comprises a continuous sheet of membrane material fitting into said notch, or channel, to permit, selectively, placing of a zone of said material over the opening to close off the chamber and replace the zone of material of the membrane, after rupture thereof in use of the apparatus with a fresh, unruptured zone of material;
and a pressure head is movably secured in the body to be movable towards the membrane sheet at the side remote from the side of the membrane facing the opening to press a zone of membrane material against the opening in the chamber and seal the membrane material thereagainst, thus closing the chamber.

2. Apparatus according to claim 1, wherein the movable pressure head and the autoclave body are formed with mutually engageable quick coupling means to permit quick release of the pressure head from engagement with the zone of membrane material, and permit movement of the sheet membrane to place a fresh zone of membrane material over said opening, and rapid re-sealing of said opening.

3. Apparatus according to claim 1, wherein the pressure head is hollow and formed as a cylinder in fluid communication with the terminal end of the pressure head facing the membrane material;
and piston means located in said cylinder to apply a pressure differential with respect to ambient air pressure against the side of the membrane material opposite that facing the pressure chamber.

4. Apparatus according to claim 1, wherein chamber is shaped to define an axis perpendicular to the plane of the sheet of membrane material and
the measuring cells are located in the body to face said chamber and aligned to form an angle of between 90° and 135° with respect to the axis of the chamber.

5. Apparatus according to claim 4, wherein said angle is about 100°.

6. Apparatus according to claim 1, wherein the body is formed with threaded bores and said measuring cells are secured into the bores and form with the body a pressure-tight, air-tight unit, the cells being located with respect to each other at an angle of between 135° to 170°, facing upwardly, whereby the axes of the bores will form an apex at their intersection, said apex being located approximately centrally of the chamber.

7. Apparatus according to claim 1, wherein the body is formed with a cylindrical bore forming a cylinder, and a piston is located in the cylinder, the bore forming the cylinder being in fluid communication with said chamber.

8. Apparatus according to claim 1, wherein the body is elongated and one portion thereof is formed with a cylindrical bore forming a cylinder and a piston is located in the cylinder, the bore forming the cylinder being in fluid communication with said chamber;
means defined a heat-stabilizing chamber surrounding said portion of the body which includes the cylinder;
and means conducting a temperature controlled fluid through said heat-stabilizing chamber.

9. Apparatus according to claim 1, further comprising a pressure pump means and suction pump means and duct means (36') connecting both said pump means in fluid communication with said chamber (14);
a check valve (44) connected to one of said pump means, and a felt plug (38) of limited porosity located in said duct means (36') to permit passage of a limited amount of fluid thereto and permit gradual equalization of pressure between the chamber and said pump means.

10. Apparatus according to claim 1, wherein the notch, or channel, comprises a slot formed in the body extending from one side surface, past the opening of the chamber, to another
side surface of the body, and the membrane material comprises an elongated strip of membrane material, insertable in said slot and movable longitudinally therethrough, to place, selectively, sequentially located zones of fresh membrane material across said opening.

11. Pressure jump relaxation measuring apparatus comprising an autoclave body (12) forming a pressure chamber (14) having a closable opening (18);
a rupturable membrane (16) closing the opening;
two electrical measuring cells (60) facing the pressure chamber (14) and means connecting said cells to an electrical output;
wherein the measuring cells are located in the body (12) facing said chamber at a relative alignment with respect to the membrane to form an angle between 90° and 135° with respect to a plane transverse to the membrane closing said opening.

12. Apparatus according to claim 11, wherein the angle is approximately 100°.

13. Pressure jump relaxation measuring apparatus comprising an autoclave body (12) forming a pressure chamber (14) having a closable opening (18);
a rupturable membrane (16) closing the opening;

two electrical measuring cells (60) facing the pressure chamber (14) and means connecting said cells to an electrical output;

the improvement comprising a movable pressure head (64) movable towards the membrane at the side remote from the side thereof facing the opening (18) to press the membrane against the opening, said movable head being hollow and formed as a cylinder, in fluid communication with the terminal end of the pressure head facing the membrane; and piston means located in said cylinder to apply a pressure differential with respect to ambient air at the side of said membrane opposite that facing the pressure chamber (14).

* * * * *